No. 701,114. Patented May 27, 1902.
M. F. WHITON.
COUPLING AND NIPPLE FOR OUTLET OR JUNCTION BOXES.
(Application filed Feb. 3, 1902.)
(No Model.)
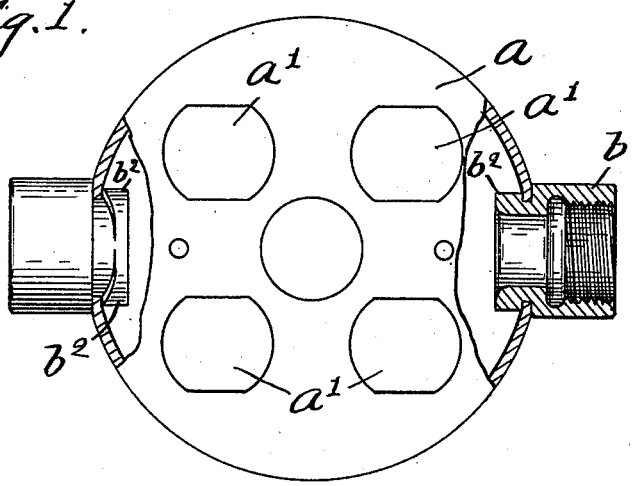
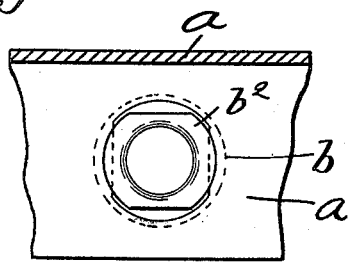
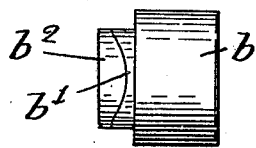
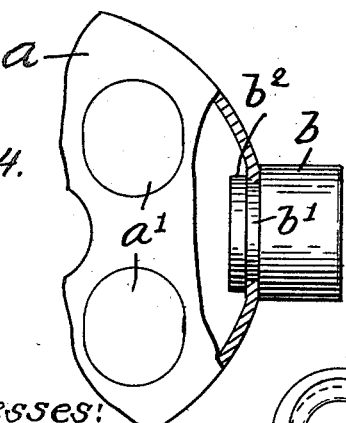
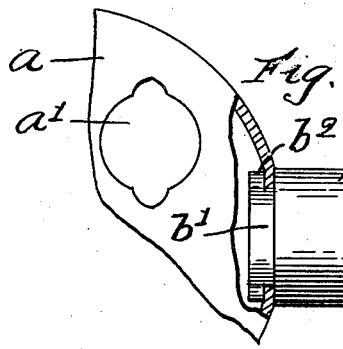
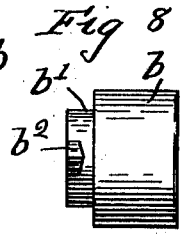
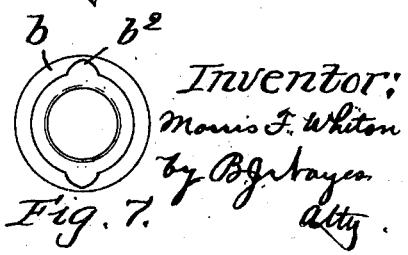
Witnesses:
H. B. Davis.
M. E. Bill
Inventor:
Morris F. Whiton
by B. J. Noyes
Atty.
THE NORRIS PETERS CO., PHOTO-LITHO., WASHINGTON, D. C.

UNITED STATES PATENT OFFICE.

MORRIS F. WHITON, OF HINGHAM, MASSACHUSETTS.

COUPLING AND NIPPLE FOR OUTLET OR JUNCTION BOXES.

SPECIFICATION forming part of Letters Patent No. 701,114, dated May 27, 1902.

Application filed February 3, 1902. Serial No. 92,343. (No model.)

*To all whom it may concern:*

Be it known that I, MORRIS F. WHITON, of Hingham, county of Plymouth, State of Massachusetts, have invented an Improvement in Couplings and Nipples for Outlet or Junction Boxes, of which the following description, in connection with the accompanying drawings, is a specification, like letters on the drawings representing like parts.

This invention relates to couplings and nipples for outlet or junction boxes, and has for its object to improve the construction of the same to the end that the coupling and nipple may be made in one piece and may be secured to the box without the employment of an independent locking device and may be introduced or inserted through any one of the holes in the box from the outside and firmly secured to the box by a certain manipulation—as, for instance, by turning the integrally-formed coupling and nipple a partial rotation after it is inserted.

In accordance with this invention the outlet or junction box is formed or provided with other than round holes, and the coupling and nipple are formed in one piece, and said integrally-formed coupling and nipple is also formed or provided with a wall-engaging end portion adapted to project through the holes in the box and be locked in engagement with the wall of the box by a partial rotation.

Figure 1 shows in plan view an outlet or junction box having two of my improved couplings and nipples, one of which is shown in side elevation and the other in longitudinal vertical section. Fig. 2 is an inside view of the wall of the box, showing an end view of the integrally-formed coupling and nipple. Fig. 3 is a side elevation of the combined coupling and nipple shown in Fig. 1. Fig. 4 shows a modified form of box with a modified form of integrally-formed coupling and nipple, Fig. 5 is an end view of the coupling and nipple shown in Fig. 4. Fig. 6 shows another modified form of box with another modified form of integrally-formed coupling and nipple. Fig. 7 is an end view of the coupling and nipple shown in Fig. 6, and Fig. 8 is a side elevation of the coupling and nipple shown in Fig. 7.

$a$ represents an outlet or junction box of circular shape, although it may be of any other desired shape, and said box is formed or provided with a number of holes $a'$ for the coupling and nipples. These holes $a'$ are made other than round, and in Fig. 1 they are shown as oblong, having two straight parallel sides and two oppositely-curved ends or sides, although in Figs. 4 and 6 these holes are differently shaped, as will be described.

The coupling and nipple are made in one piece, and said integrally-formed coupling and nipple, as shown in Figs. 1, 2, and 3, consists of a tubular cylindrical body $b$, interiorly threaded to receive a pipe and having an end portion of a shape to pass freely through said holes in the box, which is formed or provided with grooves or recesses to receive the wall of the box. As shown in said figures, the end portion of the integrally-formed coupling and nipple comprises a neck $b'$ of lesser diameter than the body $b$, which is formed or provided at its extremity with laterally-projecting portions $b^2$, there being two such portions $b^2$ formed or provided, and said portions $b^2$ are disposed relatively to the body $b$ to produce between them the wall-receiving grooves or recesses. The two laterally-projecting portions $b^2$ are oppositely disposed on the neck, and their sides or faces adjacent the body are formed more or less inclined, so that the wall-receiving grooves or recesses are gradually reduced in width to present impinging portions for the wall.

The integrally-formed coupling and nipple will be introduced or inserted through the holes in the box from the outside and when projected therethrough will be turned a partial rotation to cause the wall of the box to enter the grooves or recesses until impinged firmly in the narrow part of said grooves or recesses.

In Fig. 4 the holes in the box are made oval-shaped, and the end portion of the integrally-formed coupling and nipple will be made of a shape to pass freely therethrough and will be formed with laterally-projecting portions $b^2$; but herein the neck is likewise made oval-shaped or a shape other than round, so that when the integrally-formed coupling and nipple is inserted and partially rotated the wall enters the grooves or recesses formed or provided between the lateral projections and the end of the body and the edges of the wall will impinge upon said other than round neck. In this instance the bottoms of the grooves or recesses rising out of or beyond a true circle produce the impinging portions.

In Fig. 6 the holes are essentially circular, with recesses at opposite sides, being therefore other than round, and the end portion of the integrally-formed coupling and nipple is made of a shape to freely pass through said holes and has laterally-projecting portions $b^2$, formed with more or less inclined wall-engaging faces. The operation of this form of my improved integrally-formed coupling and nipple is substantially the same as the form shown in Figs. 1 to 3.

What I claim, and desire to secure by Letters Patent, is—

1. An integrally-formed coupling and nipple for outlet or junction boxes having other than round holes, consisting of a tubular cylindrical body having a wall-engaging end portion adapted to project through said holes, substantially as described.

2. An integrally-formed coupling and nipple for outlet or junction boxes having other than round holes, consisting of a tubular cylindrical body having an end portion adapted to project through said holes and provided with wall-receiving grooves or recesses, substantially as described.

3. An integrally-formed coupling and nipple for outlet or junction boxes having other than round holes, consisting of a tubular cylindrical body having an end portion adapted to project through said holes and provided with wall-receiving grooves or recesses provided with wall-impinging portions, substantially as described.

4. An integrally-formed coupling and nipple for outlet or junction boxes having other than round holes, consisting of a tubular cylindrical body having an end portion adapted to project through said holes and provided with wall-receiving grooves or recesses, the sides of which converge to reduce the width of said grooves or recesses and thereby produce wall-impinging portions, substantially as described.

5. An integrally-formed coupling and nipple for outlet or junction boxes having other than round holes, consisting of a tubular cylindrical body and a neck of lesser diameter having laterally-projecting wall-engaging portions, substantially as described.

6. An integrally-formed coupling and nipple for outlet or junction boxes having other than round holes, consisting of a tubular cylindrical body and a neck of lesser diameter having laterally-projecting wall-engaging portions provided with inclined wall-engaging faces, substantially as described.

In testimony whereof I have signed my name to this specification in the presence of two subscribing witnesses.

MORRIS F. WHITON.

Witnesses:
 B. J. NOYES,
 H. B. DAVIS.